United States Patent [19]

Rumsey

[11] Patent Number: 4,550,811
[45] Date of Patent: Nov. 5, 1985

[54] MANUALLY RELEASABLE PARKING BRAKE DEVICE

[75] Inventor: Steven C. Rumsey, N. Huntingdon, Pa.

[73] Assignee: American Standard Inc., Wilmerding, Pa.

[21] Appl. No.: 577,406

[22] Filed: Feb. 6, 1984

[51] Int. Cl.$^4$ .............................................. F16D 65/24
[52] U.S. Cl. ................................ 188/170; 92/21 MR; 92/130 A; 188/202; 188/216
[58] Field of Search .................... 188/170, 216, 196 D, 188/202, 72.3, 71.9, 265, 106 F, 69, 31; 192/89 B, 91 R, 101, 104 C, 84.17, 87.13, 0.075, 0.076, 4 A; 92/17, 21 R, 21 MR, 27, 28, 129, 130 A

[56] References Cited

U.S. PATENT DOCUMENTS

| | | | |
|---|---|---|---|
| 3,104,593 | 9/1963 | Clifton et al. | 92/17 |
| 3,889,576 | 6/1975 | Sheffer et al. | 92/27 X |
| 4,116,113 | 9/1978 | Leclerc | 188/170 X |
| 4,478,319 | 10/1984 | Casalone et al. | 188/216 X |

Primary Examiner—Bruce H. Stoner, Jr.
Assistant Examiner—Michael P. Gilday
Attorney, Agent, or Firm—G. E. Hawranko

[57] ABSTRACT

A manually releasable, spring-applied, air-released parking brake device has a hollow guide rod and a non-rotatable spindle connectable to the brake rigging extending through a portion of a cylindrical housing. On one end of the guide rod is secured a portion of a clutch arrangement, and on the opposite end is secured a spline member having a plurality of externally disposed spline grooves. A latching member having an extending surface engages the spline grooves of the spline member, thus preventing rotational movement of the spline member, guide rod, and clutch portion. A release lever, connected to the latching member, allows for engaging and disengaging the latching member and spline member. When the latching member has been disengaged from the spline member, as corresponds to a manual release of the parking brake device, a retractable blocking member is urged against the end surface of the spline member. The blocking member prevents engagement of the latching member and spline member, thus no longer preventing rotational movement of the spline member.

17 Claims, 3 Drawing Figures

MANUALLY RELEASABLE PARKING BRAKE DEVICE

BACKGROUND OF THE INVENTION

This invention relates to manually releasable parking brake devices as are used on transit vehicles, such parking brakes which can be of a spring-applied, air-released type. A situation may exist where the parking brake will not release due to low or no air pressure available; therefore, the quick-release apparatus must be manually operable. It is common for such parking brake to be separate from the individual tread brake units, and that the tie-in-point be a brake lever on which the tread brake and parking brake both connect. As such, one of the requirements is that such parking brake devices occupy as little mounting space as possible which, in turn, results in a small space to mount and operate the manual release portion. Typically, parking brake manual-release mechanisms have used a T-bolt arrangement accessible from the rear of the parking brake and requiring the manipulation of a tool in a confined area. Such a procedure has not only proven to be awkward, but time-consuming as well.

It is a further requirement that the manual-release portion function without adding significantly to the maintenance schedule of the overall parking brake device. The T-bolt arrangement, previously discussed, experienced frequent maintenance problems because the manner in which it was used required compressing the springs which applied the parking brake, such springs having a spring force of significant proportions, thus resulting in excessive wear on the manual-release components.

Yet another requirement of the manually releasable parking brake is that its operation does not preclude separate operation of the tread brake unit. In many currently operating manual-release parking brake devices, such is the case, as for example, the T-bolt arrangement. Manual-release arrangements which work on the rod that connects to the brake lever and pulls the rod back to overcome the spring force in the opposite direction will, in turn, effect a release of the tread brake unit; such release being undesirable in many circumstances, for instance, while doing maintenance work only on the parking brake device.

As an even further requirement of the invention is that the manual-release portion be reset to the disengaged position automatically upon resumption of air pressure.

SUMMARY OF THE INVENTION

The object of the invention, therefore, is to provide a manual release for a spring-applied, air-released parking brake, wherein the quick-release apparatus does not add significantly to the mounting space needed for the overall parking brake device.

It is a further object of this invention to effect a quick release of the parking brake device, strictly using an easily directed manual force, and without the need for a tool of any kind.

Yet another object of the invention is to use the aforementioned manual force for only a short duration to thereby e effect a quick release of the parking brake device.

An even further object of the invention is to avoid the need to overcome the spring force to effect a quick-release, such avoidance thereby reducing the force acting on the quick-release apparatus components and resulting in a longer service life for those components. In fact, it is an object of this invention to utilize the spring force in a positive manner during quick-release of the parking brake device as will hereinafter be explained in further detail.

It is yet a further object of the invention to allow for a manual-release of the parking brake without inhibiting operation of the tread brake unit.

It is yet a further object of the invention to relieve the forces acting on the manual-release apparatus components once a quick-release has been effected.

An even further object of the invention is to provide an automatic reset of the manual-release apparatus to the disengaged position upon a resumption of air pressure to the parking brake device.

Briefly, the invention consists of a guide rod which extends through the portion of the parking brake housing in which are located the brake-force applying springs and a series of stacked pistons which compress the springs during parking brake release if air pressure is available. Secured to the end of the guide rod, adjacent the stacked pistons, is a clutch seat which contacts a clutch collar during parking brake application to transmit the spring force to a spindle that extends out of the parking brake housing and attaches to the brake lever. The spindle threadably engages the clutch collar such that, in order for the spring force to be transmitted to the spindle, the clutch arrangement must be in a locked position and restrained from rotating. If the clutch seat and guide rod are not so restrained, the clutch seat and clutch collar absorb the spring force without transmitting the force to the spindle, the spindle is therefore free to follow the movement of the brake lever as may be caused by the tread brake unit.

Disposed on the end of the guide rod opposite the clutch seat is a splined portion. A latch member engages the splined portion to restrain the guide rod from rotating during operation of the parking brake when manual release is not required. A lever, mounted along the outside of the parking brake housing, operates to remove the latch from engagement with the spline. The spring force then urges the guide rod in a rightward direction such that a spline disk, mounted on the guide rod adjacent the spline portion, prevents the latch member from reengaging the splined portion.

The spline disk is spring-mounted to the guide rod so that, when the guide rod is held in the non-rotating position, axial movement of the guide rod to effect a parking brake application causes the spline disk to extend outward from the guide rod upon contacting the latch, therefore preventing the spline disk from disengaging the splined portion and latch without operating the lever.

DESCRIPTION AND OPERATION

Figure 1:
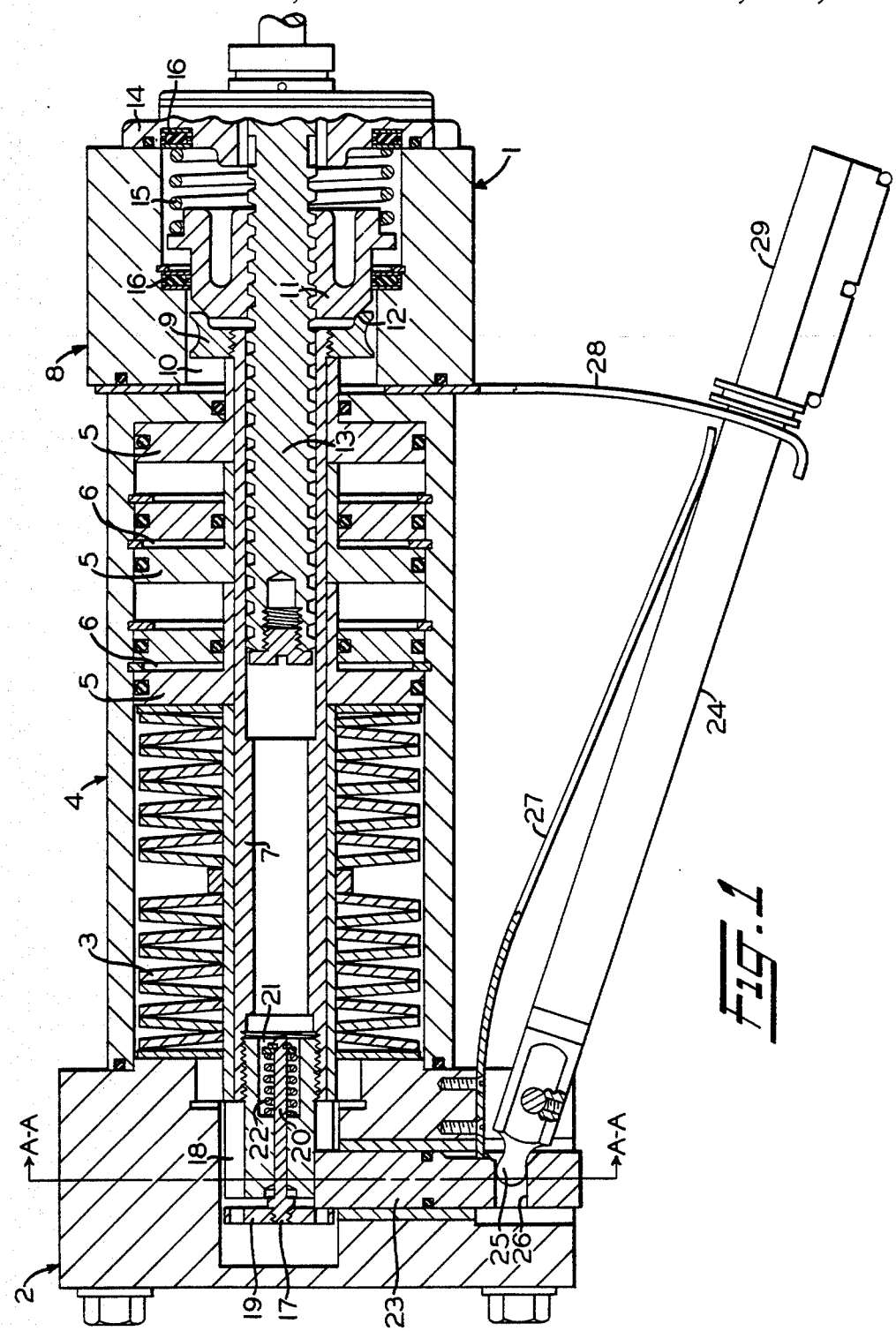
FIG. 1 is an elevational view, in section, of a manually releasable parking brake device constructed in accordance with the invention.

As shown in FIG. 1, a manually releasable parking brake device used on transit vehicles has a release housing portion 2, secured to the parking brake device 1 in the manner of an end cap portion whereby the release housing portion 2 occupies substantially the same mounting space as would an end cap. The parking brake device 1 is of a spring-applied, air-released, slack-adjusting type and is disclosed in a pending U.S. application Ser. No. 474,217 by Clemmons et al, assigned to the assignee of the present application. This parking brake device 1, as shown in FIG. 1, has a plurality of disk springs 3 disposed in a part of the parking brake housing 4 adjacent the release housing portion 2. The disk springs 3 contact a series of stacked adjacent pistons 5 which are disposed within a series of consecutively aligned piston chambers 6. When the piston chambers 6 are simultaneously pressurized by a common pressure source, the stacked pistons 5 act to compress the disk springs 3 so as to disengage the parking brake device 1. Extending coaxially through the disk springs 3 and stacked pistons 5, is a hollow guide rod 7. The guide rod 7 has one end extending into a clutch housing portion 8 of the parking brake device 1. Attached to the first end of the guide rod 7 is a clutch seat 9 which is axially and rotationally movable, along with the guide rod 7, within a clutch chamber 10. A clutch collar 11 is also disposed in the clutch chamber 10 and contacts the clutch seat 9 to form a clutch face 12. A threaded spindle 13 coaxially extends through a portion of the guide rod 7, through the clutch seat 9 and clutch collar 11, and then through an end cap 14 on the parking brake device 1 to attach to a brake lever (not shown) on which a tread brake unit (not shown) also connects. If the clutch 9, 11 is engaged, the threaded spindle will transmit the spring force to the brake lever to effect a parking brake application; if the clutch 9, 11 is not engaged, the spindle 13 will move in response to the movement of the brake lever (not shown) to effect a slack-adjusting operation.

The present device provides an alternative to the aforementioned two-way clutch operation of effecting a parking brake application when the clutch 9, 11 is engaged and releasing the parking brake device 1 when the clutch 9, 11 is not engaged. This third operating arrangement provides a quick release of the parking brake device 1 when the clutch 9, 11 is engaged. By negating the fixed connection between the clutch collar 11 and threaded spindle 13, the spring force normally transmitted to the threaded spindle 13 for axially directed parking brake applying force is absorbed by the clutch 9, 11 and a coil spring 15, thrust bearing 16 arrangement. The disengaging of the fixed connection between the clutch collar 11 and threaded spindle 13 is accomplished by use of the guide rod 7, and clutch seat 9 which is secured to the end of the guide rod 7 extending into the clutch chamber 10.

As further seen in FIG. 1, the end of the guide rod 7 opposite to the clutch seat 9 mounting, extends into the housing portion 2 and has mounted thereon a disk pin 17. A splined portion 18 is secured on the guide rod 7 adjacent the disk pin 17. The disk pin 17 is comprised of a disk portion 19, and a pin portion 20 which extends through the splined portion 18. A bias spring 22, disposed in a spring pocket 21 formed in the splined portion 18, tends to urge the disk portion 19 towards an end face of the splined portion 18.

A latching member 23 partially extends through the housing portion 2 and engages the splined portion 18 at essentially a right angle. A lever 24, secured externally to the housing portion 2, has a lever end 25 which engages a latch opening 26 formed in the latching member 23 such that, when the lever 24 is operated to the release position, the latching member 23 is urged out of engagement with the splined portion 18. A return spring 27, also secured externally to the housing portion 2, engages the lever 24 at the end opposite lever end 25, such that the lever 24 is urged by the return spring 27 to the non-release position. A lever guide 28 engages the lever 24 adjacent the handle 29 to reduce the effects of shock and vibration on the lever 24 and to ensure that the lever 24 is operated in a linear manner.

Figure 2:
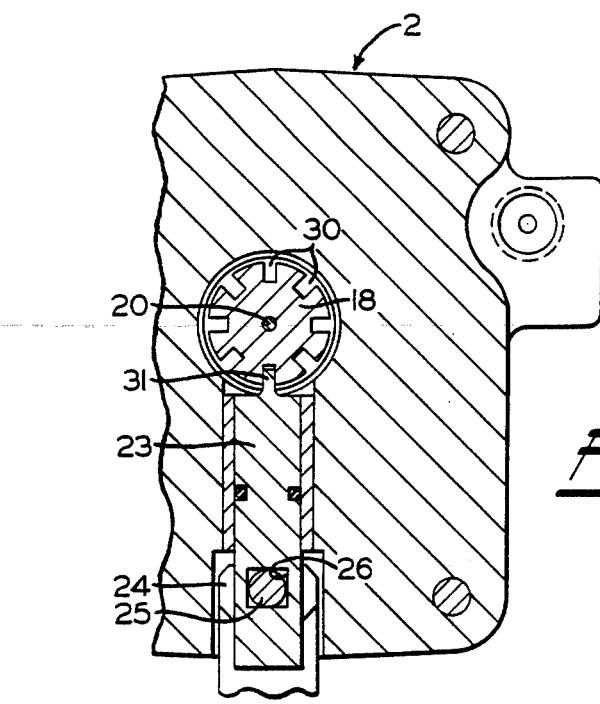
FIG. 2 is an elevational view, in section, taken along line A—A of FIG. 1 as viewed in the direction indicated by the arrows.

FIG. 2 is an illustration of the manual-release apparatus in the disengaged position, that is, with the manual release not actuated and the parking brake device 1 operating in the normal spring-applied, air-released manner. As shown in FIG. 2, equally spaced around the circumference of the splined portion 18, is a series of grooves 30. The latch portion 31 of the latching member 23 fits into one of the grooves 30 to restrain the splined portion 18, and hence guide rod 7 and clutch seat 9, from rotating.

Figure 3:
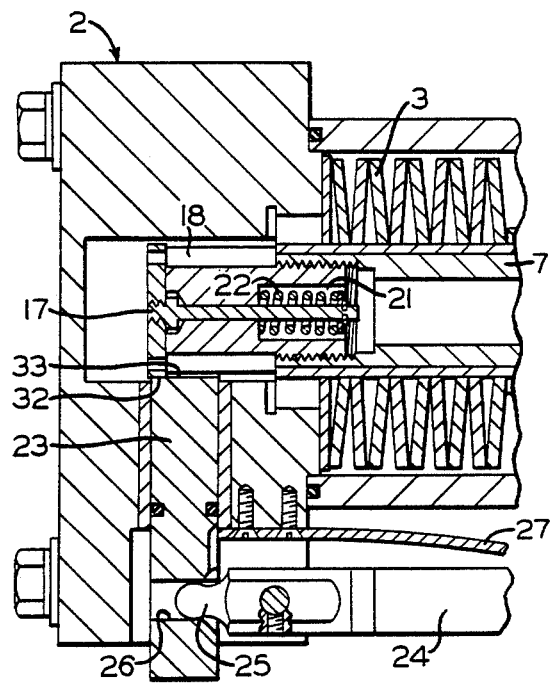
FIG. 3 is an elevational view, in section, illustrating the spline and latch in the manual-release position.

In referring to FIG. 3, it can be seen that the circumferential edge 32 of the disk portion 19 contacts the top surface 33 of the latch portion 31 when the latch member 23 has been moved out of engagement with the splined portion 18, as occurs when the quick-release apparatus has been engaged. It will be further noted that this effective contact area is kept to a minimum by the reduced thicknesses of the latch portion 31 and disk portion 19, thereby keeping to a minimum the amount of friction experienced as the guide rod 7 rotates during operation of the quick-release apparatus. It may also be appreciated that inasmuch as the contact point of the latch top 33 and circumferential edge 32 is tangential in nature, the amount of friction is further kept to a minimum.

In operation, the parking brake device 1, as shown in FIG. 1, acts to apply the force of the disk springs 3 ultimately to the brake lever (not shown) by acting through the stacked piston 5, clutch seat 9 and clutch collar 11, then to the threaded spindle 13 due to the clutch 9, 11 being in the locked position. The clutch-locked condition is achieved by operation of the quick-release apparatus in the disengaged position, as shown in FIG. 1.

The lever 24 is maintained in a "full-out" or disengaged position by the return spring 27. In this full-out position, lever end 25 engages latching member 23 such that latching member 23 is extended to the inner limit within the housing portion 2. This inner limit of the latching member 23 corresponds to the latch portion 31, fully inserted within one of grooves 30 formed in the splined portion 18, as shown in FIG. 2. With the latch portion 31 so inserted, the guide rod 7, and hence clutch seat 9, can travel only in an axial, non-rotational manner. During the parking brake application, illustrated in FIG. 1, as the clutch seat 9 and guide rod 7 move in the rightward direction, the disk pin 17 is maintained in a set position by the disk portion 19 pressing against the latch portion 31. So as not to impede the rightward travel of the guide rod 7, the pin portion 20 is pulled out of the splined portion 18 against the force of bias spring 22. It can be appreciated that the width of the latch portion 31, as looking at FIG. 1, is sufficient to prevent disengagement with the splined portion 18 at any point of travel of the guide rod 7.

Under normal parking brake operating conditions, the parking brake device 1 is released by air pressure simultaneously being fed to all piston chambers 6 from a common supply source (not shown). The air pressure urges the stacked pistons 5 in a direction to compress the disk springs 3. The clutch seat 9 moves in a leftward direction with the stacked pistons 5. The clutch collar 11 also moves leftward under the influence of the coil spring 15. As the clutch seat 9 moves out of locked engagement with the clutch collar 11, the threaded spindle 13 is free to move in and out of the parking brake unit 1 with brake lever (not shown) motion. The disk pin 17 then returns to a rest position due to the bias spring 22; the rest position being defined as the disk portion 19 resting against the end of the splined portion 18.

In situations where air pressure is not available to release the parking brake device 1, the quick-release apparatus is engaged by manually depressing lever 24 against the force of return spring 27. Depressing the lever 24 results in a smooth articulate motion of the essentially rounded lever end 25 in a counterclockwise direction. This lever motion has the effect of withdrawing the latching member 23 from engagement with the splined portion 18. Since the parking brake device 1, before the lever 24 had been depressed, was in the applied position, the force of the disk springs 3 acted in the usual manner on the stacked pistons 5, thus exerting force on the clutch seat 9 and urging the clutch seat 9 and guide rod 7 in the rightward direction. As shown now in FIG. 3, with the latch portion 23 lowered, the disk portion 19 returns to the aforementioned rest position such that the disk portion 19 travels with the guide rod 7 riding over the latch portion 31, effectively blocking re-engagement of the latching member 23 and splined portion 18. With the spline 18 and latch 23 engagement thus blocked, the guide rod 7 and clutch seat 9 are no longer restrained against rotational movement. The overriding tendency of the clutch collar 11 to rotate about the threaded spindle 13 as the threaded spindle 13 axially moves in response to movement of the brake lever (not shown), due to forces other than those originating from the parking brake device 1, thus causes the clutch seat 9 and guide rod 7 to rotate a like amount. The force of the disk springs 3 has, therefore, not been overcome by compressing the disk springs 3, but rather, has been redirected to be absorbed in the clutch housing portion 8 as the clutch seat 9, clutch collar 11, and guide rod 7 are permitted to rotate.

To automatically reset the manual-release portion to the disengaged position, air pressure now available, urges the stacked pistons 5 to compress the disk springs 3 and urge the clutch seat 9 and guide rod 7 in a leftward direction. The disk pin 17 will be moved leftward as well, thus no longer blocking engagement of the latching member 23 with the splined portion 18. The leftward movement of the guide rod 7 has a rotational motion due to the torsional force of the coil spring 15. This rotational motion of the guide rod 7 is necessary to effect a positive engagement of the latch portion 31 to one of the grooves 30 formed in the splined portion 18. Once the latch portion 31 has become aligned with one of the grooves 30, the return spring 27 acting on the lever 24 will urge the lever 24 to the full-out position, thus urging the latching member 23 into the fully-inserted position.

Though the above discussion has presented a lever-actuated, manually releasable parking brake as the preferred embodiment, other alternatives for practicing the invention are contemplated herein as well, for example a push-pull latch actuation instead of a lever.

I claim:

1. A manually releasable, spring-applied, air-released parking brake device comprising:
   (a) a cylinder housing;
   (b) a non-rotatable spindle coaxially disposed in said housing;
   (c) spring means disposed in said housing for exerting an axial spring force in a direction to effect a brake application;
   (d) piston means subjectable to fluid pressure for exerting an axial force in opposition to such spring force such that, said spring means is compressed to effect a brake release;
   (e) clutch means threadingly engageable with said spindle for selectively engaging and disengaging said spring means with said spindle, said clutch means having at least a portion which is rotatable;
   (f) a guide rod coaxially extending through at least a portion of said housing and being secured to a portion of said clutch means;
   (g) a spline member secured to the end of said guide rod opposite said clutch means for movement therewith, said spline member having a plurality of spline grooves formed externally thereon;
   (h) latching means extending partially within said housing and having at least one extending surface for engaging at least one of said plurality of spline grooves and restraining said spline member from rotational movement;
   (i) manual-release means connected to said latching means for manually removing said extending surface of said latching means from engagement with said spline groove; and
   (j) blocking means retractably connected to said spline member for blocking said extending surface of said latching means from engagement with said spline groove following operation of said manual-release means and until said guide rod is moved axially to a brake-release position.

2. A manually releasable parking brake device, as set forth in claim 1, wherein said latching means includes a latching member extending partially within said housing and having said extending surface formed thereon.

3. A manually releasable parking brake device, as set forth in claim 2, wherein said extending surface is formed symmetrically about the longitudinal axis of said latching member.

4. A manually releasable parking brake device, as set forth in claim 1, wherein said plurality of spline grooves are equally spaced about the external circumference of said spline member.

5. A manually releasable parking brake device, as set forth in claim 3, wherein said extending surface engages said at least one of said plurality of spline grooves substantially perpendicularly.

6. A manually releasable parking brake device, as set forth in claim 1, wherein said blocking means includes a disk pin having a head portion and a pin portion, and a bias spring connected to said disk pin for urging said disk pin toward said spline member.

7. A manually releasable parking brake device, as set forth in claim 6, wherein said head portion is circular and corresponds in circumference to said spline member.

8. A manually releasable parking brake device, as set forth in claim 7, wherein said bias spring is disposed in a spring pocket formed coaxially in said spline member and said pin portion extends coaxially through said spline member.

9. A manually releasable parking brake device, as set forth in claim 8, wherein said head portion has an end face contacting said extending surface during brake application such that, said disk pin is restrained from axial movement.

10. A manually releasable parking brake device, as set forth in claim 1, wherein said manual-release means includes a lever secured externally to said cylinder housing and a lever guide engaging said lever such that, said lever moves in one plane only.

11. A manually releasable parking brake device, as set forth in claim 10, wherein said manual-release means further includes a return spring contacting said lever such that, said lever is urged toward a position corresponding to disengagement of said manual release means.

12. A manually releasable parking brake device, as set forth in claim 1, wherein said guide rod has a hollow bore formed through at least a portion thereof such that, said spindle is reciprocally movable therethrough.

13. A manually releasable parking brake device, as set forth in claim 3, wherein said blocking means includes a disk pin having a head portion and a pin portion, and a bias spring connected to said disk pin for urging said disk pin toward said spline member.

14. A manually releasable parking brake device, as set forth in claim 13, wherein said bias spring is disposed in a spring pocket formed coaxially in said spline member and said pin portion extends coaxially through said spline member.

15. A manually releasable parking brake device, as set forth in claim 14, wherein said manual-release means includes a lever secured externally to said cylinder housing and a lever guide engaging said lever such that, said lever moves in one plane only.

16. A manually releasable parking brake device, as set forth in claim 15, wherein said clutch means includes a clutch seat secured to said guide rod, a rotatable clutch collar, and a coil spring for urging said clutch collar toward said clutch seat.

17. A manually releasable parking brake device, as set forth in claim 16, wherein said piston means includes a plurality of substantially similar, abutting stacked pistons disposed in a plurality of piston chambers.

* * * * *